(12) United States Patent
Colucci et al.

(10) Patent No.: US 6,248,833 B1
(45) Date of Patent: Jun. 19, 2001

(54) FIBERS AND FABRICS PREPARED WITH PROPYLENE IMPACT COPOLYMERS

(75) Inventors: Dina Marie Colucci, Nassau Bay; Chia Yung Cheng, Seabrook; William Michael Ferry, Houston; Don Allen Plank, Baytown, all of TX (US)

(73) Assignee: Exxon Mobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 09/515,361

(22) Filed: Feb. 29, 2000

(51) Int. Cl.$^7$ .............................. C08F 8/00; C08L 23/00; C08L 23/04
(52) U.S. Cl. .............................. 525/191; 525/240
(58) Field of Search ........................ 525/191, 240

(56) References Cited

U.S. PATENT DOCUMENTS

| | | | |
|---|---|---|---|
| 3,338,992 | 8/1967 | Kinney | 264/24 |
| 3,341,394 | 9/1967 | Kinney | 161/72 |
| 3,502,763 | 3/1970 | Hartmann | 264/210 |
| 3,542,615 | 11/1970 | Dobo et al. | 156/181 |
| 3,692,618 | 9/1972 | Dorschner et al. | 161/72 |
| 3,802,817 | 4/1974 | Matsuki et al. | 425/66 |
| 3,849,241 | 11/1974 | Butin et al. | 161/169 |
| 4,041,203 | 8/1977 | Brock et al. | 428/157 |
| 4,340,563 | 7/1982 | Appel et al. | 264/518 |
| 4,379,759 | 4/1983 | Goeke et al. | 252/429 B |
| 5,145,727 | 9/1992 | Potts et al. | 428/198 |
| 5,166,268 | 11/1992 | Ficker | 525/198 |
| 5,169,706 | 12/1992 | Collier, IV et al. | 428/152 |
| 5,178,931 | 1/1993 | Perkins et al. | 428/198 |
| 5,188,885 | 2/1993 | Timmons et al. | 428/198 |
| 5,258,464 | 11/1993 | McCullough, Jr. et al. | 525/244 |
| 5,362,782 | 11/1994 | McCullough, Jr. et al. | 524/108 |
| 5,382,630 | 1/1995 | Stehling et al. | 525/240 |
| 5,460,884 | 10/1995 | Kobylivker et al. | 428/373 |
| 5,554,441 | 9/1996 | Gupta et al. | 428/373 |
| 5,762,734 | 6/1998 | DeLucia et al. | 156/73.2 |
| 5,770,753 | 6/1998 | Küber et al. | 556/11 |
| 5,948,839 | 9/1999 | Chatterjee | 524/108 |
| 5,994,482 | 11/1999 | Georgellis et al. | 526/65 |
| 6,140,420 | * 10/2000 | Sehanobish et al. | 525/125 |
| 6,187,424 | * 2/2001 | Kjellqvist et al. | 428/220 |

\* cited by examiner

*Primary Examiner*—Nathan M. Nutter
(74) *Attorney, Agent, or Firm*—C. Paige Schmidt; Kevin M. Faulkner

(57) ABSTRACT

This invention relates generally to novel fibers and fabrics. Specifically, these fibers are prepared using propylene impact copolymer compositions. Fabrics, particularly nonwoven fabrics, formed from these fibers exhibit improved elongation properties.

16 Claims, No Drawings

FIBERS AND FABRICS PREPARED WITH PROPYLENE IMPACT COPOLYMERS

FIELD

This invention relates generally to novel fibers and fabrics. Specifically, these fibers are prepared using propylene impact copolymer compositions. Fabrics, particularly nonwoven fabrics, formed from these fibers exhibit improved elongation properties.

BACKGROUND

The use of various thermoplastic resins to make fibers and fabrics is well known. Examples of such resins include polyesters, polyetheresters, polyamides and polyurethanes. Polyolefins, particularly propylene homopolymers and copolymers, are thermoplastic resins commonly used to make fibers and fabrics.

Propylene impact copolymers are a type of thermoplastic resin commonly used in applications where strength and impact resistance is desired such as in molded and extruded automobile parts, household appliances, luggage and furniture. Propylene homopolymers are often unsuitable for such applications because they are too brittle and have low impact resistance particularly at low temperature, whereas propylene impact copolymers are specifically engineered for applications such as these.

Though sometimes used to make films, propylene impact copolymers have not been used to make fibers and fabrics because impact resistance is not a required property for such applications. For fibers and fabrics, manufacturers focus on properties such as strength, processability, softness and breathability.

The use of propylene homopolymers, copolymers and various blends to make nonwoven fabrics is well known. For example, U.S. Pat. Nos. 5,460,884, 5,554,441 and 5,762,734 describe the use of polypropylene blends to prepare nonwoven fabrics. U.S. Pat. No. 5,994,482 describes the use of a polypropylene alloy for making soft nonwoven fabrics.

Though a variety of properties can be obtained, the use of blends such as these has the primary disadvantages associated with the additional processing steps required to make and use blended materials. We have discovered that many of these same properties can be obtained using a propylene impact copolymer which is not post reactor blended.

A typical propylene impact copolymer contains two phases or components, a matrix component and a copolymer rubber component dispersed in the matrix. These two components are usually produced in a sequential polymerization process wherein the homopolymer produced in one or more initial reactors is transferred to one or more subsequent reactors where copolymer is produced and incorporated within the matrix component. The copolymer component has rubbery characteristics and provides the desired impact resistance, whereas the matrix component provides overall stiffness.

Many process variables influence the resulting impact copolymer and these have been extensively studied and manipulated to obtain various desired effects. For example U.S. Pat. No. 5,166,268 describes a "cold forming" process for producing propylene impact copolymers where finished articles are fabricated at temperatures below the melting point of the preform material, in this case, the propylene impact copolymer. The patented process uses a propylene impact copolymer comprised of either a homopolymer or crystalline copolymer matrix, or first component, and at least ten percent by weight of an "interpolymer" of ethylene and a small amount of propylene (the second component). Adding comonomer to the first component lowers its stiffness. The ethylene/propylene copolymer second component is said to enable the finished, cold-formed article to better maintain its shape.

U.S. Pat. No. 5,258,464 describes propylene impact copolymers with improved resistance to "stress whitening." Stress whitening refers to the appearance of white spots at points of impact or other stress. These otherwise conventional propylene impact copolymers have first and second components characterized by a numerical ratio of the second component intrinsic viscosity to the first component intrinsic viscosity which is near unity.

In U.S. Pat. No. 5,362,782, nucleating agent is added to propylene impact copolymers having a numerical ratio of the intrinsic viscosity of the copolymer rubber phase (second component) to the intrinsic viscosity of the homopolymer phase (first component) which is near unity and an ethylene content of the copolymer phase in the range of 38% to 60% by weight. These propylene impact copolymers are described as producing articles having good clarity as well as impact strength and resistance to stress whitening. The nucleating agents increase stiffness and impact strength.

Propylene impact copolymers are also used to produce films as described in U.S. Pat. No. 5,948,839. The impact copolymer described in this patent contain a conventional first component and 25 to 45 weight percent ethylene/propylene second component having from 55 to 65 weight percent ethylene.

We have discovered that fibers and fabrics prepared with impact copolymers have distinct advantages, particularly over similar products prepared with homopolymers and random copolymers.

SUMMARY

This invention relates generally to fibers and fabrics comprising reactor produced propylene impact copolymer compositions comprising from about 40% to about 95% by weight Component A based on the total weight of the impact copolymer, Component A comprising propylene homopolymer; and from about 5% to about 60% by weight Component B based on the total weight of the impact copolymer, Component B comprising propylene/comonomer copolymer, preferably propylene/ethylene copolymer, wherein the copolymer comprises at least 20% by weight isotactic propylene and at least 30% comonomer. The fibers may be spunbond or meltblown to create nonwoven fabrics.

DESCRIPTION

The propylene impact copolymers ("ICPs") useful for making the fibers and fabrics of this invention comprise at least two major components, Component A and Component B. Component A is preferably an isotactic propylene homopolymer, though small amounts of a comonomer may be used to obtain particular properties. Typically such copolymers contain 10% by weight or less, preferably less than 6% by weight or less, comonomer such as ethylene, butene, hexene or octene. Most preferably less than 4% by weight ethylene is used. The end result is usually a product with lower stiffness but with some gain in impact strength compared to homopolymer Component A.

Component A preferably has a narrow molecular weight distribution Mw/Mn ("MWDI"), i.e., lower than 4.5, preferably lower than 4.0 more preferably lower than 3.5, and most preferably 3.0 or lower. These molecular weight distributions are obtained in the absence of visbreaking using peroxide or other post reactor treatment designed to reduce molecular weight. Component A preferably has a weight average molecular weight (Mw as determined by GPC) of at least 100,000, preferably at least 200,000 and a melting point (Np) of at least 145° C., preferably at least 150° C.

Component B is most preferably a copolymer comprising propylene and comonomer, preferably ethylene, although other propylene copolymers or terpolymers may be suitable depending on the particular product properties desired. For example propylene/butene, hexene or octene copolymers may be used. In the preferred embodiment though, Component B is a copolymer comprising at least 20% by weight isotactic propylene, more preferably from about 20% by weight to about 70% by weight propylene, even more preferably from about 30% by weight to about 60% by weight propylene; and from about 30% to about 80% by weight comonomer, more preferably from about 40% to about 70% by weight comonomer, preferably ethylene. Most preferably Component B consists essentially of propylene and from about 20% to about 80% by weight ethylene, more preferably from about 30% to about 70% by weight ethylene, even more preferably from about 40% to about 60% by weight ethylene.

Component B preferably has an intrinsic viscosity greater than 1.00 dl/g, more preferably greater than 1.50 dl/g and most preferably greater than 2.00 d/g. The term "intrinsic viscosity" or "IV" is used conventionally herein to mean the viscosity of a solution of polymer such as Component B in a given solvent at a given temperature, when the polymer composition is at infinite dilution. According to the ASTM standard test method D 1601-78, IV measurement involves a standard capillary viscosity measuring device, in which the viscosity of a series of concentrations of the polymer in the solvent at the given temperature are determined. For Component B, decalin is a suitable solvent and a typical temperature is 135° C. From the values of the viscosity of solutions of varying concentrations, the "value" at infinite dilution can be determined by extrapolation.

Component B preferably has a composition distribution breadth index (CDBI) of greater than 60%, more preferably greater than 65%, even more preferably greater than 70%, still even more preferably greater than 75%, and most preferably greater than 80%. CDBI is described in detail U.S. Pat. No. 5,382,630 which is hereby fully incorporated by reference. CDBI is defined as the weight percent of the copolymer molecules having a comonomer content within 50% of the median total molar comonomer content.

The ICPs useful in this invention are "reactor produced" meaning Components A and B are not physically or mechanically blended together after polymerization. Rather, they are interpolymerized in at least one reactor. The final ICP as obtained from the reactor or reactors, however, can be blended with various other components including other polymers or additives.

The preferred melt flow rate ("MFR") of the ICPs depends on the desired end use but for meltblown fibers and fabrics is typically in the range of from about 10.0 dg/min to about 4000.0 dg/min, more preferably from about 50.0 dg/min to about 3000.0 dg/min, even more preferably from about 100.0 to about 2000.0, and most preferably from about 400.0 dg/min to about 2000.0 dg/min. MFR is determined by a conventional procedure such as ASTM-1238 Cond. L.

For spunbond fibers and fabrics, the MFR is typically in the range of from about 5.0 dg/min to about 400.0 dg/min, more preferably from about 10.0 dg/min to about 200.0 dg/min, even more preferably from about 20.0 to about 100.0, and most preferably from about 20.0 dg/min to about 70.0 dg/min The ICPs comprise from about 40% to about 95% by weight Component A and from about 5% to about 60% by weight Component B, preferably from about 50% to about 90% by weight Component A and from about 10% to about 50% Component B, even more preferably from about 60% to about 90% by weight Component A and from about 10% to about 40% by weight Component B. In the most preferred embodiment, the ICP consists essentially of Components A and B. The overall comonomer (preferably ethylene) content is preferably in the range of from about 30% to about 70% by weight and most preferably from about 40% to about 60% by weight comonomer.

A variety of additives may be incorporated into the ICP for various purposes. Such additives include, for example, stabilizers, antioxidants, fillers, colorants, nucleating agents and mold release agents. Primary and secondary antioxidants include, for example, hindered phenols, hindered amines, and phosphates. Nucleating agents include, for example, sodium benzoate and talc. Dispersing agents such as Acrowax C can also be included. Slip agents include, for example, oleamide and erucamide. Catalyst deactivators are also commonly used, for example, calcium stearate, hydrotalcite, and calcium oxide.

The ICP compositions useful in the fibers and fabrics of this invention may be prepared by conventional polymerization techniques such as a two-step gas phase process using Ziegler-Natta catalysis. For example, see U.S. Pat. No. 4,379,759 which is fully incorporated by reference. It is conceivable, although currently impractical, to produce ICPs in a single reactor. Preferably the ICPs of this invention are produced in reactors operated in series, and the second polymerization, polymerization of Component B, is preferably carried out in the gas phase. The first polymerization, polymerization of Component A, is preferably a liquid slurry or solution polymerization process.

Hydrogen may be added to one or both reactors to control molecular weight, IV and MFR. The use of hydrogen for such purposes is well known to those skilled in the art.

Metallocene catalyst systems may be used to produce the ICP compositions useful in this invention. Current particularly suitable metallocenes are those in the generic class of bridged, substituted bis(cyclopentadienyl) metallocenes, specifically bridged, substituted bis(indenyl) metallocenes known to produce high molecular weight, high melting, highly isotactic propylene polymers. Generally speaking, those of the generic class disclosed in U.S. Pat. No. 5,770,753 (fully incorporated herein by reference) should be suitable.

We have found that the ICPs described above are particularly useful for producing nonwoven fabrics and multiplayer laminates. As used herein "nonwoven fabric" means a web structure of individual fibers or filaments which are interlaid, but not in an identifiable manner as in a knitted fabric. Nonwoven fabrics have been formed from many processes such as for example, meltblowing processes, spunbonding processes and carded web processes. These are all well known in the art.

As used herein, "spunbond fibers" and "spunbond fabrics" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. Nos. 4,340,563; 3,692,618; 3,802,817; 3,338,992; 3,341,394; 3,502,763; and 3,542,615 each fully herein incorporated by reference. Spunbond fibers are generally not tacky when they are deposited onto a collecting surface to form the fabric. Spunbond fibers are generally continuous and have average diameters larger than 2 microns, more particularly, between about 10 and about 25 microns.

As used herein, "meltblown fibers" and "meltblown fabrics" refers to fibers formed by extruding a molten thermoplastic material through a plurality of fine, usually circular, die capillaries as molten threads or filaments into converging high velocity, usually hot, gas streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is well known in the art and is disclosed in, for example, U.S. Pat. No. 3,849,241 fully incorporated herein by reference. Meltblown fibers are microfibers that are either continuous or discontinuous and are generally smaller than 10 microns, preferably less than 5 microns, typically 1 to 3 microns in average diameter, and are generally tacky when deposited onto a collecting surface to form the fabric.

As used herein, "multilayer laminate" refers to a laminate wherein some of the layers are spunbond and some are meltblown such as spunbond/meltblown/spunbond (SMS) laminate and others disclosed in, for example, U.S. Pat. Nos. 4,041,203; 5,169,706; 5,145,727; 5,178,931 and 5,188,885 each fully incorporated herein by reference.

EXAMPLES

Maximum TD (transverse direction) Peak Elongation and Maximum TD Peak Load were determined by tensile testing following ASTM D882-95a.

IV ratio refers to the ratio of intrinsic viscosity of Component B to Component A.

Polymer B is an experimental homopolymer spunbond resin, with a nominal non-visbroken melt flow rate of 60.

Polymer C is a homopolymer resin, with a nominal non-visbroken melt flow rate of 20, commercially available from ExxonMobil Chemical Company and given the grade name PP3654.

Polymer D, is a random copolymer containing 3% ethylene, with a nominal non-visbroken melt flow rate of 30, commercially available from ExxonMobil Chemical Company and given the grade name PD9505 E1.

Polymer E is an impact copolymer resin, with a nominal non visbroken melt flow rate of 45, containing approximately 15% ethylene propylene copolymer, having an approximate IV ratio of 2.0, and commercially available from ExxonMobil Chemical Company and given the grade name PD 7565 E7.

Polymer F is an impact copolymer resin, with a nominal non visbroken melt flow rate of 90, containing approximately 8.5% ethylene propylene copolymer, having an approximate IV ratio of 6.0, and commercially available from ExxonMobil Chemical Company and given the grade name PP7805.

Polymer G is an impact copolymer resin, with a nominal melt flow rate of 20 visbroken from 8.5, containing approximately 15% ethylene propylene copolymer, having an approximate IV ratio of 2.0, and commercially available from ExxonMobil Chemical Company and given the grade name PD 7194 E7.

Polymer J is a blend of 70% Polymer E and 30% a commercial homopolymer PP3505G E1 with a nominal non-visbroken 400 melt flow rate. The overall blend has a nominal MFR of approximately 86, containing approximately 10.4% ethylene propylene copolymer, and having an approximate IV ratio of 1.4.

Polymer K is an impact copolymer resin, with a nominal non visbroken melt flow rate of 35, containing approximately 15% ethylene propylene copolymer, having an approximate IV ratio of 2.0, and commercially available

TABLE 1

Polymers

| Polymer | Average MWD | MFR | % EPR (comp. B) | IV Ratio | % Ethylene in Component B | % Ethylene in copolymer | Maximum TD Peak Elongation (%) | Maximum TD Peak Load (lbs) |
|---|---|---|---|---|---|---|---|---|
| A (C) | 4.1 | 32 | | | | | 98 | 3.8 |
| | | | | | | | 100 | 3.8 |
| B (C) | 3.75 | 60 | | | | | 95 | 3.8 |
| | | | | | | | 85 | 3.8 |
| C (C) | 4.25 | 20 | | | | | 102 | 4.6 |
| D (C) | 4 | 30 | | | | 3 | 92 | 3.1 |
| E | 3.75 | 45 | 15 | 2 | 58 | | 115 | 2.7 |
| | | | | | | | 110 | 3.2 |
| F | 3.25 | 90 | 8.5 | 6 | 40 | | 104 | 2.4 |
| G | 3 | 20 | 15 | 2 | 60 | | 134 | 2.2 |
| | | | | | | | 106 | 3.1 |
| J | 4 | 86 | 10.4 | 2 | 58 | | 95 | 2.55 |
| K | 3.75 | 35 | 15 | 2 | 50 | | 110 | 2.5 |
| Y (C)* | 2.25 | 35 | | | | 3 | 60 | 3.3 |
| Z (C) | 2.25 | 35 | | | | | 65 | 4.5 |

*(C) means comparative.

Polymer A is a homopolymer resin, with a nominal non visbrokenmelt flow rate of 32, commercially available from ExxonMobil Chemical Company and given the grade name PD 3345 E5.

from ExxonMobil Chemical Company and given the grade name PD 7715 E2.

Polymer Y, is a random copolymer containing 3% ethylene, with a nominal melt flow rate of 35 visbroken from 1.0, commercially available from ExxonMobil Chemical Company and given the grade name PD 9355 E1.

Polymer Z is a conventional spunbond resin, with a nominal melt flow rate of 35 visbroken from 1.0, commercially available from ExxonMobil Chemical Company and given the grade name PP 3445.

TABLE 2

Processing Conditions

| Polymer | # Times Processed at TANDEC | Melt Temp. (° C.) | Cooling Air Speed (rpm) | Suction Speed (rpm) | Optimal (*) Bonding Temperature (° F.) | % TD Peak Elongation at Optimal Bonding | % TD Peak Load at Optimal Bonding (lbs) |
|---|---|---|---|---|---|---|---|
| A (C) | 2 | 1. 240 | 1. 3000 | 1. 2500 | 1. 277 | 1. 98 | 1. 3.8 |
|  |  | 2. 250 | 2. 3000 | 2. 2500 | 2. 267 | 2. 100 | 1. 3.8 |
| B (C) | 2 | 1. 240 | 1. 3000 | 1. 2500 | 1. 273 | 1. 95 | 1. 3.8 |
|  |  | 2. 260 | 2. 3000 | 2. 2500 | 2. 267 | 2. 85 | 2. 3.8 |
| C (C) | 1 | 260 | 2300 | 2300 | 286 | 102 | 4.6 |
| D (C) | 2 | 1. 230 | 1. 3000 | 1. 2500 | 1. 247 | 1. 92 | 1. 3.1 |
|  |  | 2. 250 | 2. 3000 | 2. 2500 | 2. 246 | 2. 112 | 2. 4.1 |
| E | 2 | 1. 230 | 1. 3000 | 1. 3000 | 1. 255 | 1. 115 | 1. 2.7 |
|  |  | 2. 250 | 2. 3000 | 2. 2500 | 2. 265 | 2. 110 | 2. 3.2 |
| F | 1 | 220 | 2300 | 2100 | 246 | 104 | 2.4 |
| F(200 mfr) (C) | 1 | 200 | 2000 | 1300 | 260 | 90 | 3.1 |
| G | 2 | 1. 220 | 1. 1200 | 1. 1000 | 1. 267 | 1. 134 | 1. 2.2 |
|  |  | 2. 220 | 2. 1600 | 2. 2300 | 2. 260 | 2. 106 | 2. 3.1 |
| J(C) | 1 | 220 | 1900 | 1600 | 248 | 95 | 2.6 |
| K | 2 | 1. 230 | 1. 2300 | 1. 2100 | 1. Not achieved** | 1. Not achieved | 1. Not achieved |
|  |  | 2. 220 | 2. 1500 | 2. 1700 | 2. 260 | 2. 110 | 2. 2.5 |
| Y (C) | 1 | 210 | 1800 | 2500 | 251 | 60 | 3.3 |
| Z (C) | 1 | 230 | 3000 | 2500 | 276 | 65 | 4.5 |

*The optimal bonding temperature is the calender temperature at which the maximum TD peak elongation is observed. Coincidentally, this optimal calender temperature is also the temperature at which the maximum strength occurs.
**In this trial the calender temperature was not at the optimal condition; therefore, the maximum TD peak elongation and strength could not be determined.

Using a Reifenhauser pilot line we prepared 25 gsm spunbond fabrics at 0.4 grams per hole per minute (ghm) through put rate. We used a standard spinneret with approximately 3000 capillaries; the capillary diameter was 0.6 mm.

We adjusted fiber spinning conditions, including suction fan speed, cooling air velocity and melt temperature to provide stable fiber spinning. We varied the calender bonding temperature over a range of temperatures to determine the temperatures at which maximum TE peak elongation is observed. Coincidentally, this optimal calender temperature is also the temperature at which the maximum strength occurs Processing conditions are reported in Table 1.

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the appendant claims have single appendencies in accordance with U.S. patent practice, each of the features in any of the appendant claims can be combined with each of the features of other appendant claims or the main claim.

What is claimed is:

1. A fiber comprising a reactor produced propylene impact copolymer composition comprising:
   (a) From about 40% to about 95% by weight Component A based on the total weight of the impact copolymer, Component A comprising propylene homopolymer; and
   (b) From about 5% to about 60% by weight Component B based on the total weight of the impact copolymer, Component B comprising propylene/comonomer copolymer wherein the copolymer comprises from about 20% to about 70% by weight propylene and from about 30% to about 80% by weight comonomer.

2. The fiber of claim 1 wherein the fiber is spunbond.

3. The fiber of claim 1 wherein the fiber is meltblown.

4. The fiber of claim 1 wherein the impact copolymer composition comprises from about 50% to about 90% by weight Component A and from about 10% to about 50% Component B.

5. The fiber of claim 1 wherein Component B comprises propylene/ethylene copolymer containing from about 20% to about 70% by weight propylene and from about 30% to about 80% by weight comonomer.

6. A fiber comprising a reactor produced propylene impact copolymer composition comprising:
   (c) From about 60% to about 90% by weight Component A based on the total weight of the impact copolymer, Component A comprising propylene homopolymer; and
   (d) From about 10% to about 40% by weight Component B based on the total weight of the impact copolymer, Component B comprising propylene/comonomer copolymer wherein the copolymer comprises from about 20% to about 70% by weight propylene and from about 30% to about 80% by weight comonomer.

7. The fiber of claim 6 consisting essentially of Components A and B.

8. The fiber of claim 6 wherein Component A consists essentially of propylene homopolymer.

9. The fiber of claim 6 wherein Component B consists essentially of propylene and from about 30% to about 70% by weight ethylene.

10. The fiber of claim 6 wherein Component B has an intrinsic viscosity greater than 1.00 dl/g.

11. The fiber of claim 6 wherein the propylene impact copolymer has a molecular weight distribution of 3.0 or lower.

12. The fiber of claim 6 having an average diameter of between about 10 and about 25 microns.

13. A spunbond fiber comprising reactor produced propylene impact copolymer composition comprising:
  (a) From about 60% to about 90% by weight Component A based on the total weight of the impact copolymer, Component A comprising propylene homopolymer; and
  (b) From about 10% to about 40% by weight Component B based on the total weight of the impact copolymer, Component B comprising propylene/comonomer copolymer wherein the copolymer comprises from about 30% to about 60% by weight propylene and from about 40% to about 70% by weight comonomer.

14. The spunbond fiber of claim 13 wherein the comonomer is ethylene.

15. The spunbond fiber of claim 15 wherein the impact copolymer M is in the range of from about 5.0 dg/min to about 400 dg/min.

16. The spunbond fiber of claim 15 wherein the total ethylene content is in the range of from about 40% to about 60% by weight.

* * * * *